(12) United States Patent
Pan

(10) Patent No.: US 11,927,178 B2
(45) Date of Patent: Mar. 12, 2024

(54) DRIVE STRUCTURE FOR OIS MOTOR, OIS MOTOR, AND CAMERA DEVICE

(71) Applicant: New Shicoh Motor Co., Ltd, Zhejiang (CN)

(72) Inventor: Yin Pan, Zhejiang (CN)

(73) Assignee: New Shicoh Motor Co., Ltd, Zhejiang (CN)

( * ) Notice: Subject to any disclaimer, the term of this patent is extended or adjusted under 35 U.S.C. 154(b) by 241 days.

(21) Appl. No.: 17/613,084

(22) PCT Filed: Aug. 28, 2020

(86) PCT No.: PCT/CN2020/112089
§ 371 (c)(1),
(2) Date: Nov. 22, 2021

(87) PCT Pub. No.: WO2021/258541
PCT Pub. Date: Dec. 30, 2021

(65) Prior Publication Data
US 2022/0316459 A1    Oct. 6, 2022

(30) Foreign Application Priority Data

Jun. 23, 2020 (CN) .......................... 202021175242.1

(51) Int. Cl.
*F03G 7/06*    (2006.01)
*H02N 10/00*   (2006.01)

(52) U.S. Cl.
CPC .......... *F03G 7/0614* (2021.08); *H02N 10/00* (2013.01)

(58) Field of Classification Search
None
See application file for complete search history.

(56) References Cited

U.S. PATENT DOCUMENTS 10,067,357 B2 *  9/2018  Ladwig .................... G02B 7/09
11,347,075 B2 *  5/2022  Feng ..................... G02B 27/646
(Continued)

FOREIGN PATENT DOCUMENTS

CN      108174104        6/2018
CN      207802158 U *    8/2018
(Continued)

OTHER PUBLICATIONS

"International Search Report (Form PCT/ISA/210) of PCT/CN2020/112089," dated Mar. 24, 2021, pp. 1-4.
(Continued)

*Primary Examiner* — Rodney E Fuller
(74) *Attorney, Agent, or Firm* — JCIP GLOBAL INC.

(57) ABSTRACT

Disclosed are a drive structure for an OIS motor, an OIS motor, and a camera device. The key points of technical solutions are: a drive structure for an OIS motor includes a base, a conductive layer, a spring, and four SMA wires, the base is made of an insulating material, the conductive layer is disposed in the base, and terminals of the conductive layer protrude from the surface of the base; the base is provided with two first crimpers electrically connected to the conductive layer and disposed opposite to each other, the spring is provided with two second crimpers disposed opposite to each other, the four SMA wires are uniformly distributed on four sides of the base, and two ends of the SMA wires are respectively connected to the corresponding first crimpers and second crimpers.

6 Claims, 4 Drawing Sheets

(56) References Cited

U.S. PATENT DOCUMENTS

| | | | | |
|---|---|---|---|---|
| 2015/0304561 A1* | 10/2015 | Howarth | ................ | G02B 7/026 |
| | | | | 348/374 |
| 2016/0258425 A1* | 9/2016 | Ladwig | ................ | G02B 27/646 |
| 2017/0357076 A1* | 12/2017 | Scheele | ................ | G02B 7/026 |
| 2019/0086686 A1* | 3/2019 | Lai | ........................ | H04N 23/57 |
| 2019/0302473 A1* | 10/2019 | Hu | ........................ | G03B 29/00 |

FOREIGN PATENT DOCUMENTS

| | | |
|---|---|---|
| CN | 10956259 | 4/2019 |
| CN | 111130244 | 5/2020 |
| CN | 210776124 | 6/2020 |

OTHER PUBLICATIONS

"Written Opinion of the International Searching Authority (Form PCT/ISA/237) of PCT/ CN2020/112089," dated Mar. 24, 2021, pp. 1-4.

\* cited by examiner

DRIVE STRUCTURE FOR OIS MOTOR, OIS MOTOR, AND CAMERA DEVICE

CROSS-REFERENCE TO RELATED APPLICATION

This application is a 371 of international application of PCT application serial no. PCT/CN2020/112089, filed on Aug. 28, 2020, which claims the priority benefit of China application no. 202021175242.1, filed on Jun. 23, 2020. The entirety of each of the above-mentioned patent applications is hereby incorporated by reference herein and made a part of this specification.

TECHNICAL FIELD

The utility model relates to the field of camera equipment, in particular to a drive structure for an OIS (Optical Image Stabilization) motor, an OIS motor, and a camera device.

DESCRIPTION OF RELATED ART

At present, an OIS motor mainly includes a voice coil motor body and a stabilization mechanism connected to the voice coil motor body. The stabilization mechanisms of the existing OIS motors mainly include a split translation type, a tilt-shift type, a shape memory alloy (SMA) type, etc.

The drive structure for the existing SMA OIS consists of a separate metal base 1 (BASE), an insulating layer (sub base/spacer), a conductive layer (LCP), a crimper, a spring, a friction plate (bearing) and SMA wires.

The drive structure for the existing SMA OIS has a lot of parts with complicated structures and the parts need to be fixed by dispensing an adhesive, which leads to the complicated process of the drive structure low manufacturing efficiency and affects the qualification rate.

Therefore, it is necessary to improve such a structure to overcome the above shortcomings.

SUMMARY

The objective of the utility model is to provide a drive structure for an OIS motor, an OIS motor, and a camera device. A conductive layer is preset in a base to simplify the SMA OIS structure, reduce the cost, and simplify the process.

The above technical objective of the utility model is achieved through the following technical solution: a drive structure for an OIS motor includes a base, a conductive layer, a spring, and four SMA wires, the base is made of an insulating material, the conductive layer is disposed in the base, and terminals of the conductive layer protrude from the surface of the base; the base is provided with two first crimpers electrically connected to the conductive layer and disposed opposite to each other, the spring is provided with two second crimpers disposed opposite to each other, the four SMA wires are uniformly distributed on four sides of the base, and two ends of the SMA wires are respectively connected to the corresponding first crimpers and second crimpers.

The conductive layer is integrally formed with protrusions protruding from the surface of one end of the base facing the spring, the protrusion is connected to the first crimper, and a fixing block for fixing the first crimper is disposed between the base and the first crimper.

A further configuration of the utility model is: the end surface of the fixing block away from the base is flush with the end surface of the spring away from the base.

A further configuration of the utility model is: each of the first crimpers and the second crimpers is provided with a dispensing hole.

A further configuration of the utility model is: the conductive layer is pre-molded in the base.

A further configuration of the utility model is: one end of the base facing the spring is provided with friction grooves, and a friction plate capable of abutting against the spring is disposed in the friction groove.

A further configuration of the utility model is: an OIS motor includes the above-mentioned drive structure for SMA OIS.

A further configuration of the utility model is: a camera device includes the above-mentioned drive structure for SMA OIS.

A further configuration of the utility model is: an electronic product includes the above-mentioned drive structure for SMA OIS.

Based on the above, the utility model has the following beneficial effects:

By pre-molding the conductive layer in the base, the number of parts of the drive structure for SMA OIS is effectively reduced, the subsequent step of fixing by adhesive dispensing is avoided, the processing cost is reduced, and the assembly steps are reduced.

The first crimpers and the second crimpers fixedly clamp the corresponding SMA wires, the friction plates prevent the spring from contacting the base to maintain a distance between the spring and the base, and the friction plates play a role in lubricating the movement of the spring relative to the base.

The fixing blocks can avoid the exposure of the protrusions. In addition, the fixing blocks and the spring are located in the same plane, which can ensure that the first crimpers and the second crimpers are located in the same plane, so that the four SMA wires are flat.

BRIEF DESCRIPTION OF THE DRAWINGS

Names of corresponding parts indicated by numerals in the figures: 1—base; 2—conductive layer; 3—spring; 4—SMA; 5—terminal; 6—first crimper; 7—second crimper; 8—friction groove; 9—friction plate; 10—protrusion; 11—dispensing hole; 12—fixing block.

DESCRIPTION OF THE EMBODIMENTS

Figure 1:
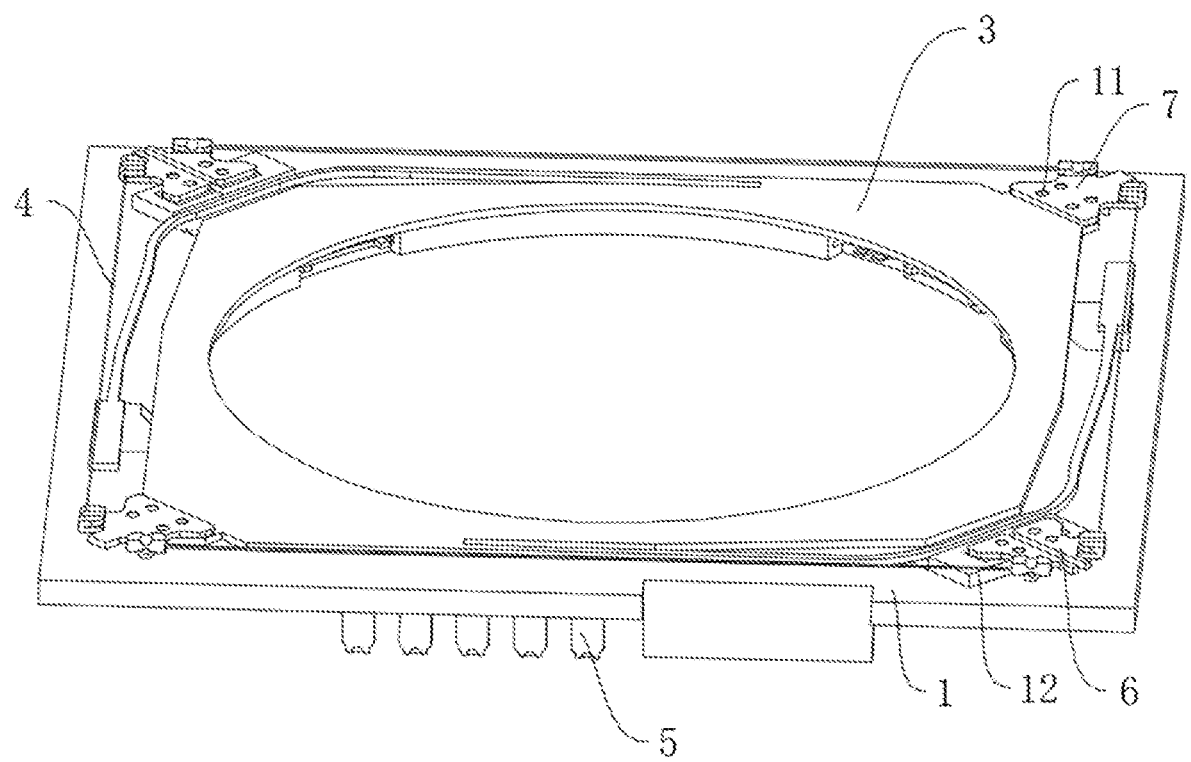
FIG. 1 is a schematic structural diagram of Embodiment 1.
Figure 2:
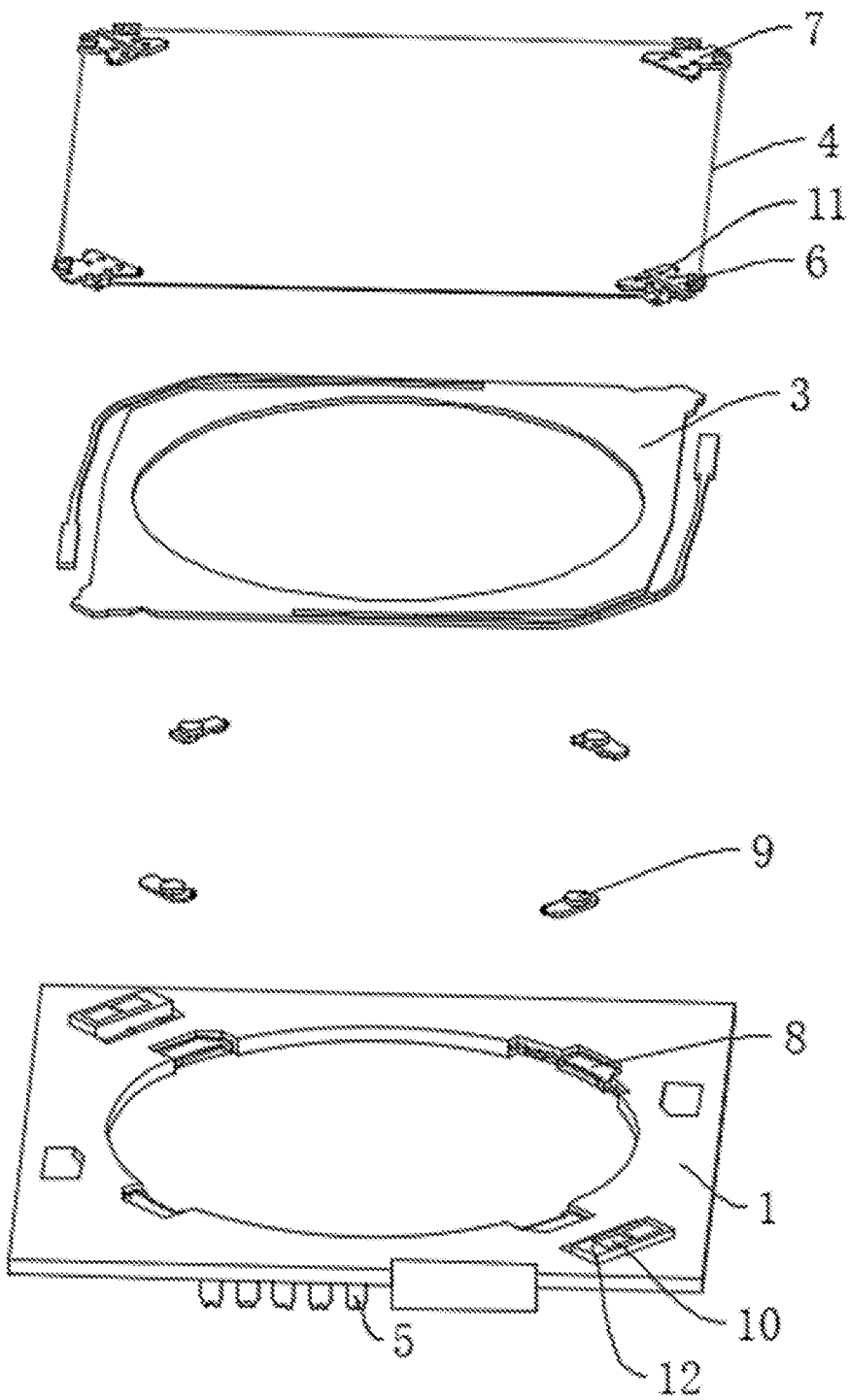
FIG. 2 is an exploded schematic diagram of Embodiment 1.
Figure 3:
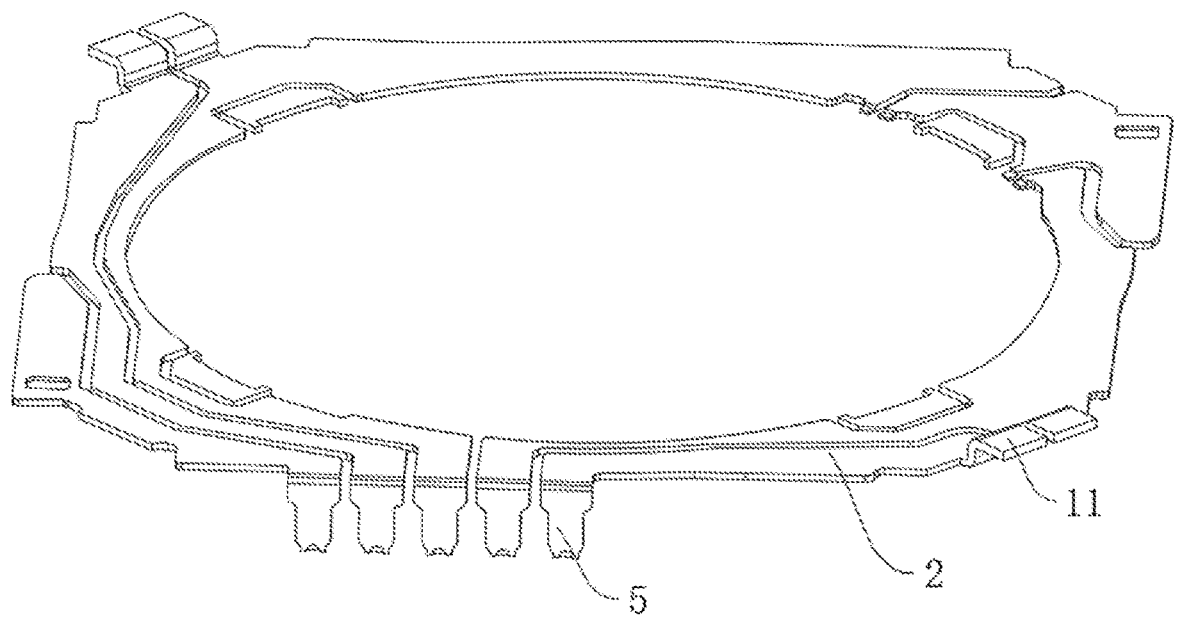
FIG. 3 is a schematic structural diagram of a base.
Figure 4:
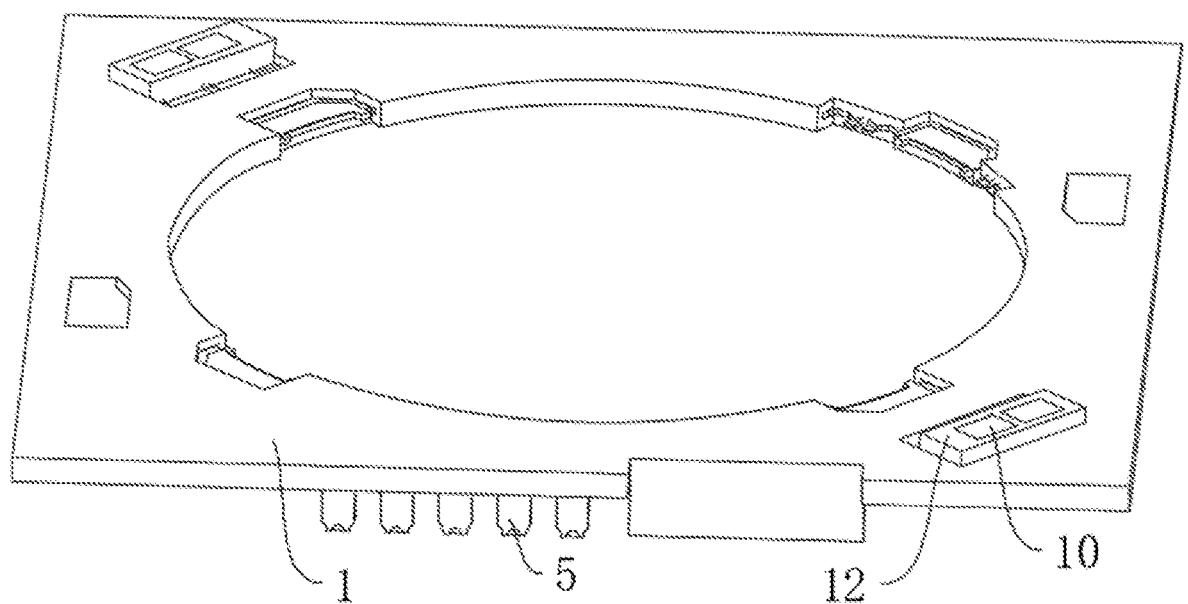
FIG. 4 is a schematic diagram of a conductive layer.

In order to make the technical means, creative features, objectives and effects of the utility model easy to understand, the utility model will be further explained below in conjunction with the drawings and specific embodiments.

Embodiment 1: As shown in FIGS. 1-4, a drive structure for an OIS motor proposed by the utility model includes a base 1, a conductive layer 2, a spring 3, and four SMA wires 4. The base 1 is made of an insulating material, which may be plastic or the like. The conductive layer 2 is disposed in the base 1, that is, when the base 1 is injection-molded, the conductive layer 2 is pre-buried in the base 1, which realizes pre-molding of the conductive layer 2 in the base 1. In addition, terminals 5 of the conductive layer 2 protrude from the lower surface of the base 1. By pre-molding the conductive layer 2 in the base 1, the number of parts of the drive structure for SMA OIS is effectively reduced, the subsequent step of fixing by adhesive dispensing is avoided, the processing cost is reduced, and the assembly steps are reduced.

The base 1 is provided with two first crimpers 6 electrically connected to the conductive layer 2 and disposed opposite to each other, the spring 3 is provided with two second crimpers 7 disposed opposite to each other, the four SMA wires 4 are uniformly distributed on four sides of the base 1, and two ends of the SMA wires 4 are respectively connected to the corresponding first crimpers 6 and second crimpers 7. In addition, one end of the base 1 facing the spring 3 is provided with friction grooves 8, and a friction plate 9 capable of abutting against the spring 3 is disposed in the friction groove 8. The first crimpers 6 and the second crimpers 7 fixedly clamp the corresponding SMA wires 4, the friction plates 9 prevent the spring 3 from contacting the base 1 to maintain a distance between the spring 3 and the base 1, and the friction plates 9 play a role in lubricating the movement of the spring 3 relative to the base 1.

In order to facilitate the electrical connection between the conductive layer 2 and the first crimpers 6, the conductive layer 2 is integrally formed with protrusions 10 protruding from the surface of one end of the base 1 facing the spring 3, the protrusion 10 is connected to the first crimper 6, and a fixing block 12 for fixing the first crimper 6 is disposed between the base 1 and the first crimper 6. The end surface of the fixing block 12 away from the base 1 is flush with the end surface of the spring 3 away from the base 1. The protrusion 10 extends to the surface of the fixing block 12 and contacts the first crimper 6. Meanwhile, the fixing block 12 can avoid the exposure of the protrusion 10. In addition, the fixing blocks 12 and the spring 3 are located in the same plane, which can ensure that the first crimpers 6 and the second crimpers 7 are located in the same plane, so that the four SMA wires 4 are flat.

In order to facilitate the fixing of the first crimpers 6 and the second crimpers 7, each of the first crimpers 6 and the second crimpers 7 is provided with a dispensing hole 11, and the dispensing holes 11 are formed in the surfaces of the first crimpers 6 in contact with the fixing blocks 12 and the surfaces of the second crimpers 7 in contact with the spring 3. The first crimpers 6 and the second crimpers 7 can be easily fixed by dispensing an adhesive in the dispensing holes 11.

Figure 5:
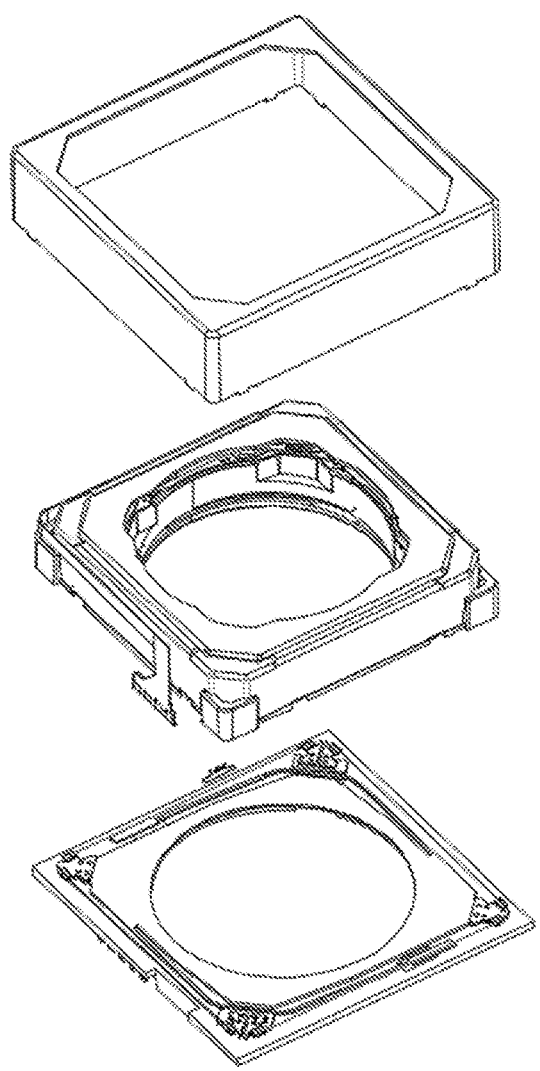
FIG. 5 is an exploded schematic diagram of Embodiment 2.
Figure 6:
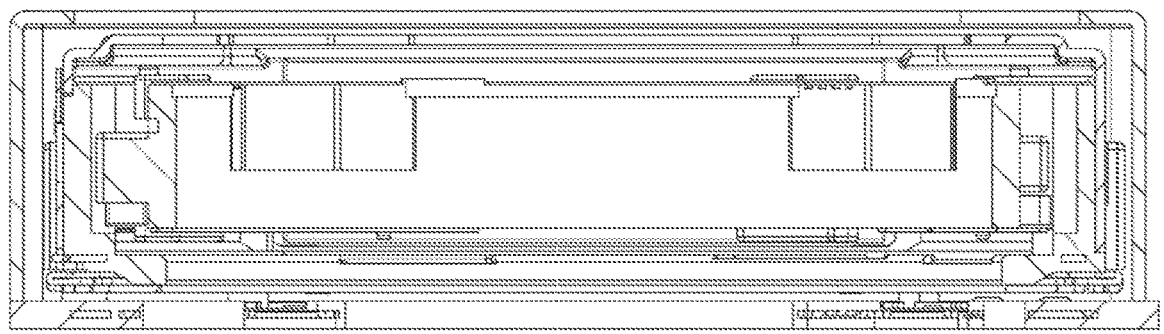
FIG. 6 is a cross-sectional view of Embodiment 2.

Embodiment 2: An OIS motor includes the drive structure for SMA OIS described in Embodiment 1, the drive structure for SMA OIS is connected with a voice coil motor body, and the voice coil motor body is fixed to the spring 3. The SMA wires 4 after powered on shrink and deform to realize the stabilization performance of the voice coil motor. FIG. 5 shows an exploded schematic diagram and FIG. 6 shows a cross-sectional view of Embodiment 2.

Embodiment 3: A camera device includes the camera device described in Embodiment 2.

Embodiment 4: An electronic product includes the drive structure for SMA OIS described in Embodiment 1.

Herein, the orientations or positional relationships indicated by the terms "upper", "lower", "front", "rear", "left", "right", "top", "bottom", "inner", "outer", "vertical", "horizontal", etc. are based on the orientations or positional relationships shown in the drawings, are only for the clarity of technical solutions and the convenience of description, and therefore cannot be understood as limitations on the utility model.

Herein, the terms "include", "comprise" or any other variants thereof are intended to encompass non-exclusive inclusion, in addition to including those elements listed, but also other elements that are not explicitly listed.

The basic principles, main features and advantages of the utility model are shown and described above. Those skilled in the art should understand that the utility model is not limited to the above embodiments, the above embodiments and the description only illustrate the principles of the utility model, the utility model will have various changes and improvements without departing from the spirit and scope of the utility model, and these changes and improvements all fall within the scope of the utility model. The scope of the utility model is defined by the appended claims and equivalents thereof.

What is claimed is:

1. An drive structure for an OIS (optical image stabilization) motor, comprising a base, a conductive layer, a spring, and four SMA (shape memory alloy) wires, wherein the base is made of an insulating material, the conductive layer is disposed in the base, and terminals of the conductive layer protrude from the lower surface of the base; the base is provided with two first crimpers electrically connected to the conductive layer and disposed opposite to each other, the spring is provided with two second crimpers disposed opposite to each other, the four SMA wires are uniformly distributed on four sides of the base, and two ends of the SMA wires are respectively connected to the corresponding first crimpers and second crimpers,
    wherein the conductive layer is integrally formed with protrusions protruding from the surface of one end of the base facing the spring, the protrusion is connected to the first crimper, and a fixing block for fixing the first crimper is disposed between the base and the first crimper.

2. The drive structure for the OIS motor according to claim 1, wherein the end surface of the fixing block away from the base is flush with the end surface of the spring away from the base.

3. The drive structure for the OIS motor according to claim 1, wherein each of the first crimpers and the second crimpers is provided with a dispensing hole.

4. The drive structure for the OIS motor according to claim 1, wherein the conductive layer is pre-molded in the base.

5. The drive structure for the OIS motor according to claim 1, wherein one end of the base facing the spring is provided with friction grooves, and a friction plate capable of abutting against the spring is disposed in the friction groove.

6. An OIS motor, comprising the drive structure for SMA OIS according to claim 1.

* * * * *